UNITED STATES PATENT OFFICE.

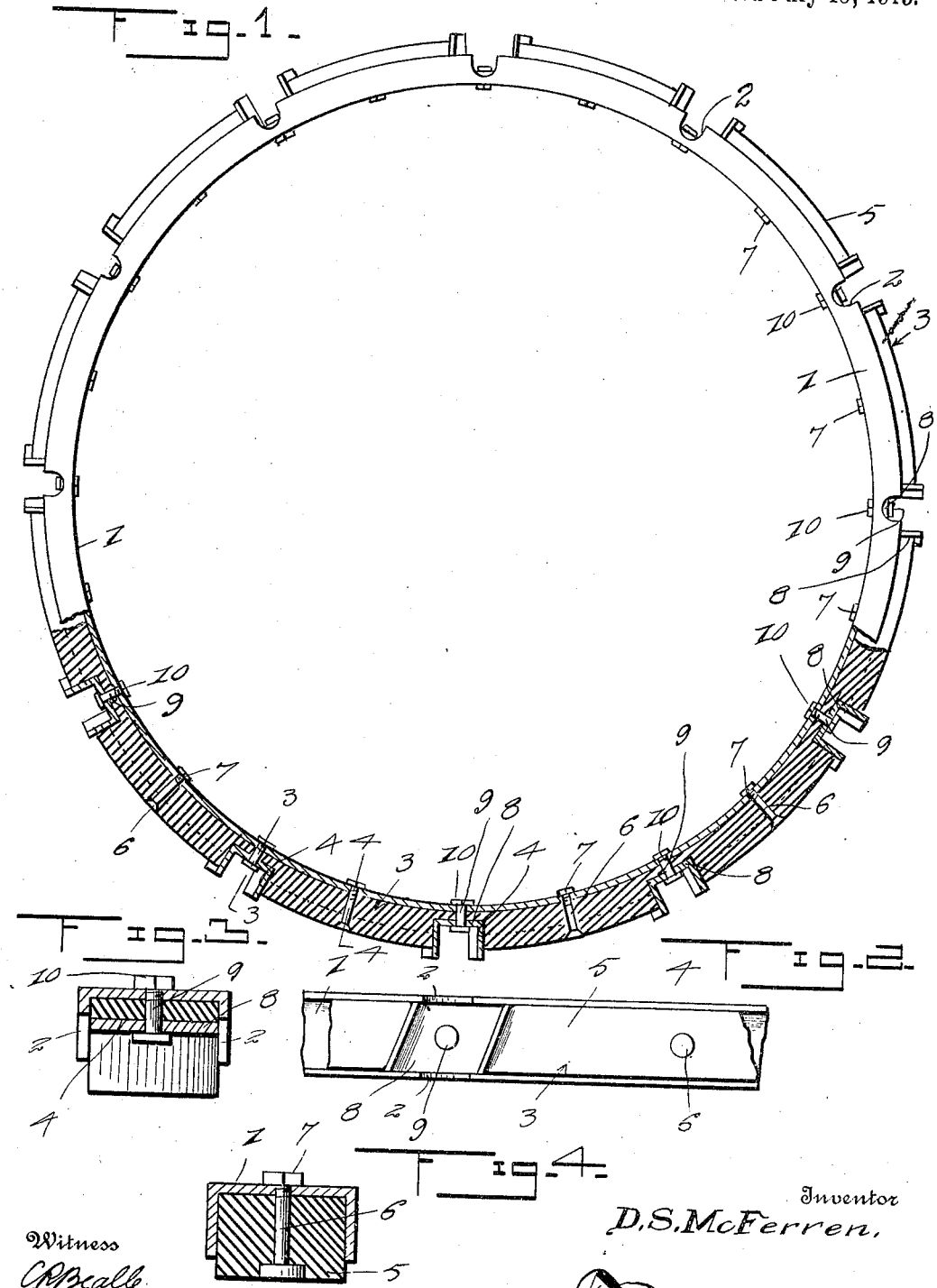

DAVID S. McFERREN, OF QUENEMO, KANSAS.

CUSHION-TIRE.

1,310,126.  Specification of Letters Patent.  Patented July 15, 1919.

Application filed September 30, 1916. Serial No. 123,056.

*To all whom it may concern:*

Be it known that I, DAVID S. McFERREN, a citizen of the United States, residing at Quenemo, in the county of Osage and State of Kansas, have invented certain new and useful Improvements in Cushion-Tires; and I do hereby declare the following to be a full, clear, and exact description of the invention, such as will enable others skilled in the art to which it appertains to make and use the same.

This invention relates to cushion tires designed especially for automobile wheels, and an object of the invention is the provision of a tire of this type including an auxiliary rim adapted to encircle or fit over the rim of one of the wheels of the automobile, and a cushion tread carried by the auxiliary rim and having associated therewith, at spaced points, novel anti-skidding elements which can be conveniently detached from the tread when they become worn, so as to admit of the substitution of new ones.

Other objects will appear and be better understood from that embodiment of my invention of which the following is a specification, reference being had to the accompanying drawing forming a part thereof, in which:

Figure 1 is a side view of the tire, with a portion of the same partially in section, Fig. 2 is a detail plan view of a portion of the tire, Fig. 3 is a transverse sectional view taken on the line 3—3 of Fig. 1, Fig. 4 is a transverse sectional view, taken on the line 4—4 of Fig. 1.

Referring to the drawing in detail, the tire is shown as consisting of an auxiliary rim 1, which is formed of channel iron having the opposite sides thereof provided with cut-out portions 2, said cut-out portions 2 admitting of the channel iron being rolled into circular formation, and the cut-out portions 2 on one side of the rim being slightly offset from the cut-out portions 2 on the opposing side of the rim, as shown more clearly in Fig. 2 of the drawing. The rim 1 receives a circular tread portion 3, preferably formed of rubber, and the said tread portion is provided at spaced points with diagonally extending or oblique grooves or recesses 4, the said grooves defining tread sections 5. Fastening bolts 6 extend through the tread sections 5 of the tire and have their outer or headed ends countersunk in the tread sections, as shown in Figs. 1 and 4 of the drawings, the inner ends of the bolts being extended through the connecting portions for the sides of the rim 1 and have nuts 7 turned thereon and adjustable against the inner side of the rim, so as to prevent withdrawal of the bolts 6. The grooves 4 in the tire 3 receive anti-skidding elements 8. These anti-skidding elements 8 are of substantially U-shape in cross section and have their sides extended diagonally and parallel with the sides of the grooves 4. The anti-skidding elements 8 are held within the grooves by means of bolts 9, which extend through the connecting portions for the sides of the anti-skidding elements 8 and through the tire and rim 1, and have those ends which extend through the rim 1 provided with nuts 10, which are adjustable against the rim and serve to hold the bolts 9 against accidental withdrawal. The free ends of the sides of the anti-skidding elements 8 project beyond the outer faces of the tread sections 5, so as to admit of an effective purchase being had with the road surface. By virtue of the fact that the sides of the anti-skidding elements 8 are extended diagonally and parallel with the sides of the grooves 4 lateral movement of the vehicle body will be prevented when the anti-skidding elements 8 engage in the road surface.

It is evident that various changes might be resorted to in the construction, form and arrangement of the parts without departing from the spirit and scope of the invention as claimed.

What I claim is:

In combination, a rim having a pair of peripheral flanges, said flanges having recesses in their outer edges, a tread element mounted in said rim and provided with a plurality of grooves extending transversely thereof, U-shaped elements disposed in the grooves of said tread element and projecting beyond the same, the recesses of said flanges alining with said U-shaped elements whereby dirt collected in said U-shaped elements is discharged through said recesses.

In testimony whereof I affix my signature in presence of two witnesses.

DAVID S. McFERREN.

Witnesses:
C. W. DOTY,
HARRY HARKNESS.

Copies of this patent may be obtained for five cents each, by addressing the "Commissioner of Patents, Washington, D. C."